United States Patent [19]

Dietz et al.

[11] 4,410,451

[45] Oct. 18, 1983

[54] CATALYST AND PROCESS

[75] Inventors: Richard E. Dietz; Melvin B. Welch, both of Bartlesville, Okla.

[73] Assignee: Phillips Petroleum Company, Bartlesville, Okla.

[21] Appl. No.: 328,982

[22] Filed: Dec. 9, 1981

[51] Int. Cl.$^3$ .............................................. C08F 4/64
[52] U.S. Cl. ................................. 502/110; 502/111; 502/134; 526/125; 526/124
[58] Field of Search ............ 252/429 R, 429 B, 429 C

[56] References Cited

U.S. PATENT DOCUMENTS

| | | | |
|---|---|---|---|
| 3,129,256 | 4/1964 | Hay et al. | 252/429 B X |
| 3,642,746 | 2/1972 | Kashiwa et al. | 252/429 C X |
| 3,644,318 | 2/1972 | Diedrich et al. | 260/88.2 |
| 3,789,036 | 1/1974 | Longi et al. | 260/80.7 |
| 3,859,231 | 1/1975 | Kochhar et al. | 252/429 R |
| 3,953,414 | 4/1976 | Galli et al. | 526/348 |
| 4,006,101 | 2/1977 | Matsuura et al. | 252/429 C |
| 4,013,823 | 3/1977 | Longi et al. | 526/166 |
| 4,156,063 | 5/1979 | Giannini et al. | 252/429 B X |

*Primary Examiner*—Patrick Garvin

[57] ABSTRACT

A high surface area catalyst component or support is produced by swelling a magnesium halide, e.g., $MgCl_2$, with a secondary or tertiary alcohol, adding a hydrocarbon diluent, and removing some or substantially all of the free or unreacted alcohol. In one preferred embodiment, the alcoholate product is contacted with a halogenated tetravalent titanium compound, e.g., $TiCl_4$, to form a first catalyst component (A) which can be combined with a cocatalyst component (B) comprising a metallic hydride or an organometallic compound, e.g., an organoaluminum compound to form a catalyst system active for olefin polymerization.

15 Claims, No Drawings

CATALYST AND PROCESS

BACKGROUND OF THE INVENTION

This invention relates to new catalysts, a process for preparing the catalyst, and use of the catalysts. In one aspect, the invention relates to a high surface area catalyst support or component prepared by swelling a magnesium dihalide with a secondary or tertiary alcohol. In another aspect, this invention relates to a catalyst prepared by swelling a particulate magnesium dihalide with a secondary or tertiary alcohol followed by removal of unreacted alcohol and treatment with a titanium tetrahalide. In another aspect, this invention relates to the formation of a magnesium dihalide catalyst component and catalyst composition as defined above which can be used with a cocatalyst comprising a metallic hydride or an organometallic compound to form a catalyst system useful for the polymerization of alpha-olefins. In a further aspect, this invention relates to a process for forming a catalyst system produced by swelling a particular magnesium dihalide with a secondary or tertiary alcohol, adding a hydrocarbon diluent, and removing some or substantially all of the alcohol, and contacting the product thus formed with a halogenated tetravalent titanium compound to form a first catalyst component.

It is known to polymerize alpha-olefins and mixtures thereof according to a low pressure process in which the catalysts used are prepared from mixtures of compounds of element of Subgroups IV—VI of the Periodic Table and organometallic compounds of the elements of Groups I-III of the Periodic Table. The polymerization is generally carried out in suspension, in solution, or even in a gaseous phase.

The activity of an olefin polymerization catalyst is one important factor in the continuous search for a catalyst useful for the polymerization of alpha-olefins. It is also desirable that the process used in forming catalyst be such as to allow ease in preparation and to allow control over the final catalyst formed. It is also desirable to produce a catalyst of the organometallic type that comprises chiefly an inert support which is not harmful when left in the polymer. It is also advantageous to prepare a catalyst containing low amounts of residual materials whereby deashing of the produced polymer can be eliminated and a simple deactivation of the residual catalyst is all that is required. The present invention relates to an improved catalyst exhibiting increased activity and possessing some of the above mentioned advantages.

Accordingly, an object of this invention is to provide an improved catalyst.

Another object of this invention is to provide a high surface area metal halide suitable as a catalyst component or support.

Another object of this invention is to provide a process for preparing a novel catalyst.

Another object of this invention is to provide an improved process for the polymerization of alpha-olefins.

Other objects, aspects and the several advantages of this invention will be apparent to those skilled in the art upon a study of this disclosure and the appended claims.

SUMMARY OF THE INVENTION

According to the invention, a high surface area metal dihalide, e.g., magnesium dihalide, is prepared by swelling particulate dihalide with a secondary or tertiary alcohol under conditions to form an alcoholate having increased surface area. The resulting alcoholate product is suitable as a catalyst support or component.

In accordance with one embodiment of the invention, an active catalyst component is produced by swelling a particulate magnesium dihalide with a secondary or tertiary alcohol, removing excess alcohol from the alcoholate thus formed, and treating the alcoholate product with a tetravalent halogenated titanium compound to obtain a catalyst (component A).

Further, in accordance with another embodiment of the invention, the catalyst produced as defined above (component A) is combined with a cocatalyst (component B) comprising a metallic hydride or an organometallic compound wherein the metal is selected from Groups IA, IIA and IIIA of the Periodic Table to form an active olefin polymerization catalyst.

In a specific and presently preferred embodiment of the invention, an active olefin polymerization catalyst is produced by swelling a particulate magnesium dihalide such as magnesium dichloride with a secondary or tertiary alcohol, adding a hydrocarbon diluent, removing some or substantially all of the alcohol, for example by distillation, and contacting the product thus produced with a halogenated tetravalent titanium compound, e.g., titanium tetrachloride, to form a catalyst component (component A). The catalyst component A can be washed with a dry hydrocarbon to remove unreacted titanium compound and dried, if desired, to obtain the catalyst of this invention.

The high surface area magnesium dihalide prepared as set forth above can be used as part of catalyst component A or combined with other catalyst components to form a catalyst having utility for the conversion of organic materials.

Catalyst component A can be used with an organometallic cocatalyst (component B) such as an organoaluminum compound to form a catalyst system that is used to polymerize alpha-olefins such as ethylene or mixtures of olefins such as ethylene admixed with a higher 1-olefin. Normally solid polymers are recovered from the polymerization and converted into film, molded articles, and the like, by means of extrusion, blow molding, etc.

Magnesium dihalides that can be used according to the invention have the formula $MgX_2$ wherein X is a halogen selected from bromine, chlorine, or iodine. A magnesium dihalide normally employed is preferably magnesium dichloride because of low cost, availability and efficacy. The magnesium dichloride is used in anhydrous form and it is preferably ground to a fine powder to expedite formation of the alcoholate. Ball milling is a convenient method of grinding the $MgCl_2$.

The first step of preparing the catalyst comprises swelling the magnesium dihalide with a secondary or tertiary alcohol. The secondary or tertiary alcohol can be expressed as ROH where R is an alkyl group containing from 3 to about 10 carbon atoms, preferably from about 3 to about 6 carbon atoms. Exemplary alcohols include 2-propanol (isopropanol—presently preferred), 2-butanol, 2-methyl-2-propanol (tertiary butanol), 2-pentanol, 3-pentanol, 3-methyl-2-butanol, 2-methyl-2-butanol, 2-hexanol, 4-decanol and the like and mixtures thereof.

Although the $MgX_2$ can be reacted with neat alcohol, it is presently preferred to conduct the reaction in the presence of a dry hydrocarbon diluent inert in the process such as n-heptane. Suitable hydrocarbons include paraffins, cycloparaffins, or aromatic hydrocarbons containing from about 4 to about 12 carbon atoms per molecule which are inert in the process. Exemplary hydrocarbons include n-butane, n-pentane, n-hexane, methylcyclohexane, benzene, toluene, and the like. Generally any well known inert hydrocarbon diluent can be used. The mole ratio of hydrocarbon to alcohol can range from about 25:1 to about 0.02:1, preferably from about 10:1 to about 1.5:1 since catalytic activity is particularly enhanced in the latter range.

The contact time between $MgX_2$ and ROH is dependent upon the particle size of the $MgX_2$ to some extent with the finely ground material requiring less time to react. Generally, a contact time ranging from about 0.5 to about 60 hours can be used at room temperature. For example, at about 25° C., using 2-propanol as the alcohol, diluted 1:6 (vol/vol) with n-heptane and ball milled $MgCl_2$, a contact time of 1 hour is adequate.

Generally, the initial temperature employed in contacting the $MgX_2$ and the alcohol, whether neat or admixed with a hydrocarbon, can range from about room temperature, e.g., 20° C., to the reflux temperature at atmospheric pressure of the liquid. Since heat can be evolved as the coordination compound (alcoholate) is formed, it is usually convenient to begin initial contacting at about room temperature. When an elevated temperature is used, a contacting of about 1 hour, or less, is preferred.

The moles of alcohol employed per mole of $MgX_2$ can range from about 2:1 to about 50:1, more preferably from about 4:1 to about 25:1.

When employed, the mole ratio of hydrocarbon per mole of $MgX_2$ can range from about 20:1 to about 250:1, preferably from about 50:1 to about 175:1.

The moles of alcohol associated with the $MgX_2$ as alcohol of crystallization can vary to some extent but generally can vary from about 1 to about 6 and more preferably from 1 to about 3.

After formation of the alcoholate is concluded, the excess alcohol can be removed by distillation along with some of the alcohol of crystallization associated with the $MgX_2$. This loss of alcohol can vary somewhat depending upon the alcohol, the $MgX_2$ employed and whether hydrocarbon is present such that an alcohol-hydrocarbon azeotrope can form. When the alcohol is 2-propanol, the $MgX_2$ is $MgCl_2$, and n-heptane is present (in the quantity specified above) the alcoholate formed has been shown by analysis to have a formula corresponding to: $MgCl_2 \cdot (C_3H_7OH)_{1.2}$. Further loss of alcohol can result in marked loss of catalyst activity. Generally, the distillation is continued no longer than about 1 hour after the alcohol has been removed as the azeotrope, for example. During this period, hydrocarbon can be allowed to distill slowly. The resulting alcoholate will have a high surface of at least about 75 m$^2$/g and can range up to about 150 m$^2$/g.

In a presently preferred embodiment of the invention, the product obtained after swelling the magnesium dihalide with secondary or tertiary alcohol is contacted with a tetravalent halogenated titanium compound. Any suitable tetravalent, halogenated titanium compound can be used as long as the titanium compound has one halogen attached thereto. Suitable compounds can be represented by the formula $TiX_a(OR')_{4-a}$ in which X stands for bromine, chlorine or iodine or mixtures thereof, a is an integer of 1 to 4 and R' is an alkyl, cyclo-alkyl or aryl group and combinations thereof, such as alkaryl, containing from 1 to about 20 carbon atoms. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like. A presently preferred compound is titanium tetrachloride because of availability and relatively low cost.

The contacting can be carried out generally at temperatures in the range of about 0° C. to about 150° C. with the decomposition temperature of the tetravalent, halogenated titanium compound determining the upper limit. The length of the contacting period can vary greatly with the period of time generally ranging from about 0.05 to about 20 hours.

The mole ratio of magnesium (based on initial metallic magnesium) to titanium compound can range from about 0.05:1 to 1:1. Excess titanium compound is removed by contacting the reaction product with a hydrocarbon inert in the process, e.g., a paraffin, cycloparaffin, or aromatic hydrocarbon.

The formed catalyst, component A, is then combined with a cocatalyst, component B, to form a catalyst system useful for the polymerization of olefins. Component B is a hydride or an organometallic compound wherein said metal is selected from an element of Groups IA, IIA and IIIA of the Periodic Table. In other words, component B can be a hydride of the metals of Groups IA, IIA and IIIA or an organo-compound of the metals. The preferred compound to be used as component B is an organoaluminum compound which can be represented by the formula $AlR''_bY_{3-b}$ in which R'' is the same or different hydrocarbon radical selected from such groups as alkyl, cycloalkyl, aryl, alkaryl, and the like, having from 1 to about 12 carbon atoms per molecule, Y is a monovalent radical selected from among the halogens and hydrogen, and b is an integer of 0 to 3. The presently most preferred cocatalysts are the trihydrocarbylaluminum compounds, especially the trialkylaluminum compounds. Specific examples of organoaluminum compounds include trimethylaluminum, triethylaluminum, triisobutylaluminum, tridodecylaluminum, tricyclohexylaluminum, triphenylaluminum, tribenzylaluminum, diethylaluminum chloride, diisobutylaluminum hydride, ethylaluminum dibromide, and the like.

In addition, catalyst component A can be admixed with a diluent in particulate form such as polyethylene, polypropylene, poly(methyl methacrylate), silica, alumina, calcium carbonate, and the like. If a polymer is employed its melting or softening temperature should be higher than reaction temperature. Suitably diluent is admixed with the magnesium dihalide and other catalyst components during milling. The weight ratio of magnesium dihalide to solid particulate diluent can range from about 1:99 to about 99:1.

Any alpha-olefin or mixture thereof, can be polymerized in the presence of the catalyst of the present invention with the preferred reactant being ethylene or ethylene plus another higher aliphatic mono-1-olefin containing from 3–10 carbon atoms. Preferably, the ethylene polymers will contain from about 90 to 100 weight percent ethylene and about 10 to 0 weight percent comonomer. The alpha-olefin is polymerized by contact with the catalyst system of this invention in solution, in suspension or in gaseous phase at temperatures ranging from about 20°–200° C. and pressures ranging from about atmospheric (15 psia) to about 1000 psia (0.1–6.9 MPa). The homopolymerization and copolymerization reactions can be conducted batchwise or in continuous fashion by employing any known process.

It is convenient when polymerizing ethylene in a bench scale process, for example, to conduct the polymerization batchwise in a stirred reactor employing a dry hydrocarbon diluent inert in the process such as isobutane, n-heptane, methylcyclohexane, benzene, toluene, and the like, at a reactor temperature of about 80° C. and a reactor pressure of about 300 psia (2.1 MPa). Ethylene is admitted to the reactor as required to maintain the desired pressure. Molecular weight control agents such as hydrogen, can be employed in the reactor as known in the art to adjust the molecular weight of the polymer.

When the selected polymerization time is reached, the reaction can be terminated by discontinuing the flow of ethylene and comonomer, if used, venting unreacted monomer(s) and diluent and recovering the polymer. The recovered product can be treated to deactivate or remove catalyst residues such as by an alcohol wash, can be stabilized by admixture with an antioxidant(s) and can be dried to remove residual solvent, if present, as is known in the art. The final product can be further processed into pellets and/or converted into the final shaped product.

The following examples are set forth as illustrative of this invention and are not meant to be restrictive in any way.

EXAMPLE 1

Catalyst Preparation

A series of catalyst compositions were prepared by admixing $MgCl_2$, dried under nitrogen at 400° C. and roll milled for 48 hours, an alcohol (ROH) selected from methanol, 1-propanol, 2-propanol, and tert-butanol, and n-hexane as the hydrocarbon diluent. In several instances, a solid particulate diluent, e.g., polyethylene powder or silica, was incorporated into the composition.

Generally, the components were charged to a flask arranged for stirring, purging nitrogen, refluxing and distillation. Free (unreacted) alcohol was substantially removed from each mixture by fractional distillation until the overhead temperature reached the boiling point of n-heptane (about 97° C.). At that time, slow distillation was continued an additional period of time, e.g., 1–2 hours. The mixture was then cooled to about 75°–80° C. and $TiCl_4$ was charged, e.g., usually about 100 mL (173 g, 0.91 mole). The mixture was then refluxed for 2 hours (HCl was evolved), the mixture cooled to room temperature and the product washed with portions of n-hexane until the wash liquid was essentially free of unreacted $TiCl_4$. In some instances, the purified slurry was diluted with additional n-hexane and stored in that fashion. In those instances, a 10 mL portion of the mixture was evaporated to dryness to determine the weight of catalyst contained per mL. When a solid diluent was incorporated with the catalyst, the entire mixture was usually dried under a vacuum to recover the finished catalyst as a powder.

Ethylene was polymerized in a 3.8 liter, stirred, stainless steel reactor employing a sample of each catalyst, a triethylaluminum cocatalyst (TEA), and isobutane as diluent. Ethylene was admitted as required on demand from a reservoir to maintain the desired pressure during the run.

Prior to each run, the reactor was conditioned by charging it with 3 liters of n-heptane, closing the port, and heating the contents at 175° C. for 30 minutes. The reactor was then drained, residual heptane purged out with nitrogen and the reactor cooled to room temperature under nitrogen.

In a typical polymerization run, the conditioned reactor was swept with isobutane vapor to remove the nitrogen, the cocatalyst solution was added followed by the catalyst. The reactor was then closed, hydrogen added, if used, and then 1.2 liters of isobutane was charged. The reactor was heated to the desired temperature, usually 80° C. or 100° C., and the ethylene was charged to provide a partial pressure of 0.689 MPa (100 psi) or 1.58 MPa (230 psi). After 1 hour (usually), polymerization was terminated by flashing ethylene, isobutane, and any hydrogen from the reactor. The polymer was recovered, dried, weighed, and stabilized with a conventional stabilizer system if any physical properties, e.g., melt index, were to be subsequently determined.

The components employed in preparing each catalyst, contact times and mole ratios are presented in Table Ia. The polymerization results obtained with the catalysts are given in Table Ib.

TABLE Ia

| | | Catalyst Preparation | | | | | | | |
|---|---|---|---|---|---|---|---|---|---|
| | | Catalyst Components, Grams | | | | Contact[a] Time, hrs. | Mole Ratios | | |
| Cat. No. | $MgCl_2$ | ROH Name | g | n-heptane (initial) | $TiCl_4$ | Solid Diluent | ROH/n-heptane /$MgCl_2$ | ROH $MgCl_2$ | n-hep $MgCl_2$ | n-hep ROH |
| 1 | 3 | MeOH[b] | 7.92 | 342 | 173 | 30.15(PE)[c] | 1.5 | 7.7 | 107 | 14 |
| 2 | 3 | MeOH | 39.6 | 479 | 173 | 0 | 0.5 | 39 | 149 | 3.8 |
| 3 | 3 | MeOH | 23.8[d] | 479 | 173 | 0 | 0.5 | 23 | 149 | 6.4 |
| 4 | 3 | 1-PrOH | 40.2 | 410 | 173 | 6.58(S) | 0.5 | 21 | 128 | 6.1 |
| 5 | 3 | 2-PrOH | 39.5 | 410 | 173 | 48.6(PE) | 1.0 | 21 | 128 | 6.2 |
| 6 | 3 | t-BuOH | 39.0 | 410 | 173 | 25.2(PE) | 1.5 | 16 | 128 | 7.8 |
| 7 | 3 | t-BuOH | 77.9 | 410 | 173 | 0 | 0.5 | 33 | 128 | 3.9 |

[a]Contact time between alcohol, initial amount of hydrocarbon diluent, and $MgCl_2$.
[b]MeOH = methanol, PrOH = propanol, BuOH = Butanol
[c]PE = polyethylene, S = silica
[d]Also includes 1 mL (10.4 mmoles) of trichloroethanol

TABLE Ib

Ethylene Polymerization, 80° C., 1 Hour, 3 Millimoles TEA
Effect of Alcohol Type On Catalyst Productivity

| Run No. | Catalyst No. | Total mg | Diluent Free Basis, mg | Pressures MPa Ethylene | Pressures MPa Total | Yield g | Productivity, kg/g[e] Total Catalyst | Productivity, kg/g[e] Diluent Free Basis |
|---|---|---|---|---|---|---|---|---|
| 1 P | 1 | 7.7 | .77 | 0.689 | 1.96 | 32 | 4.16 | 41.6 |
| 2 P | 2 | 25.0 | 25.0 | " | " | 395 | 12.4 | 12.4 |
| 3 P | 3 | 25.1 | 25.1 | " | " | 310 | 25.5 | 25.5 |
| 4 P | 4 | 19.2 | 9.6 (est)[f] | " | " | 21 | 1.10 | 11 (est) |
| 5 P | 5 | 3.8 | 0.38 | " | 1.93 | 99 | 26.1 | 261 |
| 6 P | 6 | 20.0 | 2.0 | " | " | 21 | 1.05 | 10.5 |
| 7 P | 7 | 9.0 | 9.0 | " | " | 180 | 200 | 200 |

[e]Calculated productivity determined by dividing polymer yield in grams by weight of catalyst in grams. If catalyst contains a diluent then productivity in terms of the active catalyst on a diluent free basis is also calculated.
[f]Estimated weight based on catalyst preparation.

The results in Tables Ia, b indicate that more active catalysts in this invention result when the catalysts are prepared from magnesium alcoholates derived from secondary and tertiary alcohols, exemplified by 2-propanol and t-butanol, rather than primary alcohols, exemplified by methanol and 1-propanol, and preferably from 2-propanol as shown in invention run 5P.

EXAMPLE II

A. Catalyst preparation.

A series of compositions containing MgCl$_2$, dried under nitrogen at 400° C. and then roll milled for 48 hours, 2-propanol and n-heptane were prepared by charging 10 oz (295 mL) beverage bottles with the specified components. The bottles were capped and roll milled for 48 hours to produce a slurry in each instance thus giving a contact time between alcohol and MgCl$_2$ of 48 hours.

Each slurry was individually charged to a flask arranged for a nitrogen atmosphere, stirring, refluxing and distillation and then diluted to a total volume of about 900 mL with n-heptane. Each mixture was then distilled until the overhead temperature reached the boiling point of n-heptane (97° C.) and substantially all free alcohol was thereby removed. Slow distillation was continued an additional hour at 97° C. The mixture was then cooled to about 75°–80° C. and to it was charged 100 mL (172.6 g, 0.91 mole) of TiCl$_4$. The mixture was then refluxed for 2 hours. Much HCl evolved at about 90° C. The mixture was then cooled to room temperature and the slurry washed with portions of n-hexane until unreacted TiCl$_4$ was essentially removed. Each catalyst slurry was transferred to a 32 oz (946 mL) bottle, diluted to about 800 mL with n-hexane, and the bottle capped. A 10 mL portion of each resulting mixture was evaporated to dryness to determine the weight of catalyst in that portion.

B. Another series of mixtures were prepared from portions of the starting components described in Part A. In this series, however, the components were charged to the distillation flask, stirred for a specified time, and then distillation of the alcohol, addition of TiCl$_4$ and refluxing carried out as before. To each cooled mixture was stirred in a specified amount of polyethylene of about 400 g/10 minute melt index, ASTM D 1238-70, which had been previously sieved through a U.S. Series 50 mesh screen and dried at 80° C. under a high vacuum. The mixture was then washed with n-hexane to remove unreacted TiCl$_4$ as before and the product was recovered and dried at room temperature under high vacuum to yield the catalyst.

The components employed in preparing each catalyst, volume and mole ratio, and contact time are given in Table IIa. The polymerization results obtained for ethylene with the catalysts described above in combination with a triethylaluminum cocatalyst (TEA) reacted in a manner as described in Example I are presented in Table IIb. ROH is 2-propanol in all instances.

TABLE IIa

| | Catalyst Preparation | | | | | | | | |
|---|---|---|---|---|---|---|---|---|---|
| | Catalyst Components, Grams | | | | | Contact Time,[a] Hrs. | Mole Ratios | | |
| Cat. No. | MgCl$_2$ | ROH | n-Heptane (Initial) | TiCl$_4$ | PE Fines | ROH/n-heptane /MgCl$_2$ | ROH MgCl$_2$ | n-Heptane MgCl$_2$ | n-Heptane ROH |
| 8 | 3 | 78.9 | 0 | 173 | 0 | 48 | 41 | na[b] | na |
| 9 | 3 | 59.2 | 17.1 | 173 | 0 | 48 | 31 | 5.3 | 0.18 |
| 10 | 3 | 39.4 | 34.2 | 173 | 0 | 48 | 20 | 10 | 0.52 |
| 11 | 3 | 19.7 | 51.3 | 173 | 0 | 48 | 10 | 16 | 1.6 |
| 12 | 10 | 237 | 684 | 518 | 162 | 1 | 24 | 65 | 2.7 |
| 13 | 3 | 39.5 | 205 | 173 | 48.6 | 0.5 | 13 | 64 | 5.0 |
| 14 | 3 | 39.5 | 342 | 173 | 48.6 | 1 | 13 | 106 | 8.2 |
| 15 | 3 | 39.5 | 410 | 173 | 48.6 | 1.5 | 13 | 128 | 9.9 |
| 16 | 3 | 39.5 | 410 | 173 | 48.6 | 0.5 | 13 | 128 | 9.9 |
| 5 | 3 | 39.5 | 410 | 173 | 48.6 | 1 | 13 | 128 | 9.9 |

[a]Contact time between alcohol, initial amount of hydrocarbon diluent, and MgCl$_2$.
[b]Not applicable.

TABLE IIb

Ethylene Polymerization, 80° C., 1 Hour, 3 Millimoles TEA

| Run No. | Catalyst No. | Total mg | Diluent Free Basis mg | Pressures, MPa Ethylene | Pressures, MPa Total | Polymer Yield Grams | Productivity, kg/g[2] Total Catalyst | Productivity, kg/g[2] Diluent Free Basis |
|---|---|---|---|---|---|---|---|---|
| 8P | 1 | 3.4 | na[1] | 0.689 | 1.97 | 454 | 134 | na |
| 9P | 2 | 3.6 | na | .689 | 2.00 | 695 | 193 | na |
| 10P | 3 | 3.2 | na | .689 | 2.00 | 260 | 81.2 | na |
| 11P | 4 | 3.3 | na | .689 | 2.00 | 598 | 181 | na |
| 12P | 5 | 12.6 | 1.26 | .689 | 1.93 | 332 | 26.3 | 263 |
| 13P | 6 | 5.1 | 0.51 | .689 | 1.93 | 276 | 54.1 | 541 |
| 14P | 7 | 4.3 | 0.43 | .689 | 1.93 | 170 | 39.5 | 395 |
| 15P | 8 | 6.0 | 0.60 | .689 | 1.93 | 231 | 38.5 | 385 |
| 16P | 9 | 11.1 | 1.11 | .689 | 1.93 | 345 | 31.0 | 310 |
| 5P | 10 | 3.8 | 0.38 | .689 | 1.93 | 99 | 26.1 | 261 |

Notes:
[1] Not applicable, no solid diluent employed in preparing the catalyst.
[2] Calculated productivity determined by dividing polymer yields in grams by weight of catalyst in grams. Note that catalysts 5–10 were each 10% active component by weight. On a diluent free basis, calculated productivity for the active component is 10 times greater than for total catalyst mixture.

Inspection of the results in Tables IIa, IIb shows that very active ethylene polymerization catalysts are prepared, particularly evident with the catalysts diluted with the polyethylene fines in runs 5P (repeated from Table Ib) and 12P–16P. In the absence of hydrogen, the calculated productivities ranged from about 260 to about 540 kg polyethylene per g catalyst (diluent-free basis) per hour at 80° C. and 0.689 MPa ethylene pressure. In the presence of hydrogen, scattered results (not presented) suggest that the productivity can be reduced about 50–75% at otherwise similar polymerization conditions. However, see Example IV for further elucidation.

The productivity results of Table IIb in runs 8P–11P also indicate that catalyst activity appears to increase when $MgCl_2$ is contacted with the alcohol in the presence of a hydrogen diluent. Contact time ranging from 0.5–48 hours have given good results.

EXAMPLE III

A sample of commercial $MgCl_2$, dried at 420° C. under nitrogen for 3 hours was divided into several portions.

One portion was sieved and that passing through a 20 mesh screen (U.S. Sieve Series) was retained for a surface area measurement.

A second portion was roll milled with ½" (1.3 cm) diameter steel balls for 48 hours. A recovered sample was retained for a surface area measurement.

A third portion was vibratory ball milled with ½" diameter balls for 24 hours. A recovered sample was retained for a surface area measurement.

A fourth portion was treated with 2-propanol in the presence of 479 g of n-heptane in the manner specified for invention catalyst 5. A sample of the dried recovered catalyst was retained for a surface area measurement.

The surface area of each sample was determined in accordance with the BET method as known in the art.

The surface area results for the various samples are given in Table III.

TABLE III

Surface Areas of Treated MgCl

| Treatment Description | Surface Area $m^2/g$ |
|---|---|
| as received, minus 20 mesh fraction | 3.6 |
| roll milled, 48 hours | 20.2 |

TABLE III-continued

Surface Areas of Treated MgCl

| Treatment Description | Surface Area $m^2/g$ |
|---|---|
| vibratory milled, 24 hours | 123. |
| heat 3 g $MgCl_2$, 39.5 g 2-propanol and 479 g n-heptane at 97° C. for 1 hour, recover product, wash with n-hexane and dry under vacuum | 108 |

The results show that $MgCl_2$ treated as described in the preparation of the invention catalysts exhibits a surface area in excess of 100 $m^2/g$ and approaches a surface area of that made by vibratory ball milling. It is believed that the combination of the small particle size activated $MgCl_2$ prepared conveniently in the manner described in this invention coupled with the solution impregnation of the particles with $TiCl_4$ results in the high activity catalyst.

EXAMPLE IV

A catalyst similar to catalyst 5 of Example I was prepared in a similar manner by charging 3 g (0.0315 mole) of dried $MgCl_2$, 39.5 g (0.657 mole) of 2-propanol and about 547 g (5.46 moles) of n-heptane to the flask. The mixture was immediately heated until the overhead temperature reached 97° C. with substantial removal of all free alcohol in about 30 minutes. Slow distillation was continued an additional hour at 97° C. The mixture was then allowed to cool to about 70° C. After adding 100 mL (0.91 mole) of $TiCl_4$ the mixture was refluxed for 2 hours, cooled to about 25° C. and to it was charged 48.6 g of the previously described polyethylene powder. The mixture was stirred well and the slurry was washed with portions of n-hexane until unreacted $TiCl_4$ was essentially removed. The product was recovered, and dried at ambient temperature under a vacuum to produce invention catalyst 11 which contained 10 wt. % active catalyst and 90 wt. % polyethylene powder.

The initial contact between alcohol, n-heptane and $MgCl_2$ was about 1.5 hours. The calculated mole ratios are: 2-propanol/$MgCl_2$ of 21, n-heptane/$MgCl_2$ of 173, and n-heptane/2-propanol of 8.3.

Portions of the dry catalyst were individually tested for ethylene polymerization in the presence of hydrogen and a specified organoaluminum compound as cocatalyst.

The quantities of materials employed, conditions used, and results obtained are presented in Table IV.

See footnote (2) of Table IIb for a description of the determination of calculated productivities.

TABLE IV

Ethylene Polymerization, 100° C., 1 Hour, 1.38 MPa Ethylene Partial Pressure
0.34 MPa Hydrogen From a 2.4 L vessel

| Run No. | Catalyst Weight mg | Cocatalyst Name | mmoles | ppm | Polymer Yield g | Melt Index | Productivity, kg/g Total Cat. | Diluent Free Basis | Remarks |
|---|---|---|---|---|---|---|---|---|---|
| 17P | 0.0069 | triethylaluminum[4] | 4.6 | 470 | 75.5 | 1.6 | 10.9 | 109. | See Note 1 |
| 18P | 0.0119 | " | 2.8 | 290 | 189.5 | 0.6 | 15.9 | 159. | See Note 2 |
| 19P | 0.0169 | " | 1.4 | 140 | 159 | 1.2 | 9.41 | 94.1 | |
| 20P | 0.0136 | " | 0.82 | 84 | 88 | 1.2 | 6.47 | 64.7 | |
| 21P | 0.0216 | " | 0.46 | 47 | 192 | 0.6 | 8.89 | 88.9 | |
| 22P | 0.0238 | " | 0.18 | 19 | 177.5 | 0.4 | 7.46 | 74.6 | See Note 3 |
| 23P | 0.0314 | " | 0.09 | 9 | 187 | 0.4 | 5.96 | 59.6 | |
| 24P | 0.0064 | triisobutylaluminum[5] | 5.3 | 950 | 58 | 0.7 | 9.06 | 90.6 | |
| 25P | 0.0072 | " | 3.5 | 630 | 46 | 0.7 | 6.39 | 63.9 | |
| 26P | 0.0154 | " | 1.8 | 320 | 123 | 0.6 | 7.99 | 79.9 | |
| 27P | 0.0112 | " | 0.88 | 160 | 74 | 0.4 | 6.61 | 66.1 | |
| 28P | 0.0086 | " | 0.35 | 63 | 37 | 0.6 | 4.30 | 43.0 | |
| 29P | 0.0170 | " | 0.11 | 20 | 44 | 0.4 | 2.59 | 25.9 | |
| 30P | 0.0109 | diethylaluminum chloride[6] | 4.9 | 530 | 7.5 | 0.2 | 0.688 | 6.88 | |
| 31P | 0.0207 | " | 2.8 | 300 | 13 | 0.2 | 0.628 | 6.28 | |
| 32P | 0.0199 | " | 1.4 | 150 | 9 | 0.1 | 0.452 | 4.52 | |
| 33P | 0.0230 | " | 0.76 | 83 | 8 | 0.1 | 0.348 | 3.48 | |
| 34P | 0.0295 | " | 0.38 | 41 | 5 | 0.1 | 0.169 | 1.69 | |

[1]Average of 2 runs, actual values: cat. Wt 0.0075, 0.0062 g; yield 87, 64 g; productivity 11.6, 10.3 kg/g
[2]Average of 2 runs, actual values: cat. Wt 0.0159, 0.0080 g; yield 248, 131 g; productivity 15.6, 16.4 kg/g
[3]Average of 2 runs, actual values: cat. Wt 0.0344, 0.0133 g; yield 274, 81 g; productivity 7.97, 6.09 kg/g
[4]Used as a 15 wt. % solution in n-heptane.
[5]Used as a 10.2 wt. % solution in n-heptane.
[6]Used as a 12.5 wt. % solution in n-hexane.

Inspection of the results for runs 17P-29P presented in Table IV shows that the invention catalyst can be highly productive in the presence of hydrogen when a trialkylaluminum cocatalyst is employed and particularly when relatively high concentrations of the cocatalyst are used. Based on the productivity values and the amounts of cocatalyst employed, triethylaluminum gives somewhat better results than triisobutylaluminum in this series.

As runs 30P-34P show, diethylaluminum chloride is relatively ineffective as a cocatalyst based on the low productivity values and the low melt index values obtained.

We claim:

1. A catalyst characterized by the product obtained by
   (a) reacting finely divided particulate $MgX_2$ where X is Br, Cl or I with an excess of a secondary or tertiary alcohol under conditions which cause swelling of the particulate magnesium dihalide and forms an alcoholate of increased surface area and a final surface area ranging from about 75 to 150 $m^2/g$,
   (b) removing excess or unreacted alcohol from the product formed in (a) under conditions sufficient to reduce the alcohol present to less than 2 moles per mole magnesium dihalide,
   (c) contacting the finely divided alcoholate product substantially freed of unreacted alcohol obtained in (b) with a tetravalent halogenated titanium compound to form a catalyst component (A), and
   (d) a cocatalyst component B comprising a metallic hydride or organometallic compound wherein said metal is selected from Groups IA, IIA, and IIIA of the Periodic Table.

2. A catalyst according to claim 1 wherein the magnesium dihalide is magnesium dichloride, the alcohol has the formula ROH wherein R is an alkyl group containing from 3 to about 10 carbon atoms, and the titanium compound is titanium tetrachloride.

3. A catalyst according to claim 2 wherein the cocatalyst is a trihydrocarbylaluminum compound.

4. A catalyst according to claim 3 wherein the trihydrocarbylaluminum compound is triethylaluminum or triisobutylaluminum.

5. A catalyst according to claim 2 wherein the alcohol is 2-propanol or tert-butanol.

6. A catalyst according to claim 1 wherein (a) is carried out in the presence of a hydrocarbon diluent with a mole ratio of hydrocarbon to alcohol ranging from about 25:1 to about 0.02:1 and with the moles of alcohol to magnesium dihalide employed ranging from about 2:1 to about 50:1 and further wherein the product of (a) has a surface area of at least about 75 $m^2/g$.

7. A catalyst according to claim 1 wherein the magnesium dihalide is milled prior to reacting with the alcohol.

8. A catalyst according to claim 2 which additionally contains a particulate solid diluent.

9. A catalyst according to claim 1 obtained by
   (a) reacting $MgCl_2$ with isopropanol or tert-butanol in a hydrocarbon diluent,
   (b) distilling some or substantially all of the excess or unreacted alcohol from the product formed in (a) to leave a slurry of particulate magnesium dichloride alcoholate in the hydrocarbon,
   (c) contacting the slurry product of (b) with a hydrocarbon solution of $TiCl_4$, and
   (d) combining the product formed in (c) with triethylaluminum.

10. A method of preparing a catalyst comprising
    (a) swelling a $MgX_2$ wherein X is Br, Cl or I with an excess of a secondary or tertiary alcohol in a hydrocarbon diluent under conditions which cause swelling of the particulate magnesium chloride and produces an alcoholate of increased surface area and a final surface area ranging from about 75 to 150 $m^2/g$, (b) removing excess or unreacted alcohol from the alcoholate thus produced under conditions sufficient to reduce the alcohol present to less than 2 moles per mole magnesium dihalide and leave a slurry of particulate magnesium dihalide alcoholate in the hydrocarbon diluent, (c) contacting the alcoholate substantially freed of alcohol remaining in (c) with a tetravalent halogenated titanium compound, (d) washing the product obtained in (c) with an inert solvent to remove unreacted titanium compound, and (e) combining a cocatalyst component comprising a metallic hydride or organometallic compound wherein said metal is selected from Groups IA, IIA and IIIA of the Periodic Table with product of (d).

11. A method according to claim 10 wherein step (a) is carried out with a mole ratio of hydrocarbon to alcohol in the range of about 25:1 to about 0.02:1 and at a temperature ranging from about room temperature (20° C.) to the reflux temperature, the excess alcohol in (b) is removed by fractional distillation and the contacting in (c) is carried out by refluxing with said titanium compound in an inert hydrocarbon solvent.

12. A method according to claim 10 wherein step (a) is carried out by reacting $MgCl_2$ with isopropanol or tert-butanol in a hydrocarbon diluent, said alcoholate in (c) is contacted with $TiCl_4$ in the presence of a hydrocarbon diluent, and the washing in (d) is carried out with a hydrocarbon diluent.

13. A catalyst prepared according to claim 10 wherein the washed product in (c) is combined with a solid diluent.

14. A catalyst prepared according to claim 10 wherein the magnesium halide is $MgCl_2$, said alcohol is isopropanol or tert-butanol, said titanium compound is $TiCl_4$, and said cocatalyst is trialkylaluminum compound.

15. A catalyst prepared according to claim 14 wherein said trialkylaluminum compound is triethylaluminum.

* * * * *